I. C. WOODWARD.
NUT LOCK.
APPLICATION FILED JULY 8, 1915.

1,175,034.

Patented Mar. 14, 1916.

Witness
W. F. Smith

Inventor.
Irving C. Woodward,
by Rummler & Rummler
Attys.

UNITED STATES PATENT OFFICE.

IRVING C. WOODWARD, OF CHICAGO, ILLINOIS.

NUT-LOCK.

1,175,034.　　　　　Specification of Letters Patent.　　Patented Mar. 14, 1916.

Application filed July 8, 1915.　Serial No. 38,651.

*To all whom it may concern:*

Be it known that I, IRVING C. WOODWARD, a citizen of the United States of America, and a resident of Chicago, county of Cook, and State of Illinois, have invented certain new and useful Improvements in Nut-Locks, of which the following is a specification.

The main objects of this invention are to provide an improved nut lock of the kind described in my Patent No. 1,137,941 of May 4, 1915, wherein the threads are coated with suitable material so as to cause the nut to grip the threads of the bolt and to effectively prevent the nut from accidentally backing off or becoming loosened through being jarred and strained in service; and to provide an improved arrangement of the coating material whereby the same will effectively lock the nut and at the same time permit the threads of the nut and bolt to be in direct contact with each other on those sides thereof which are normally subjected to strain.

An illustrative embodiment of this invention is shown in the accompanying drawings, in which—

Figure 1:
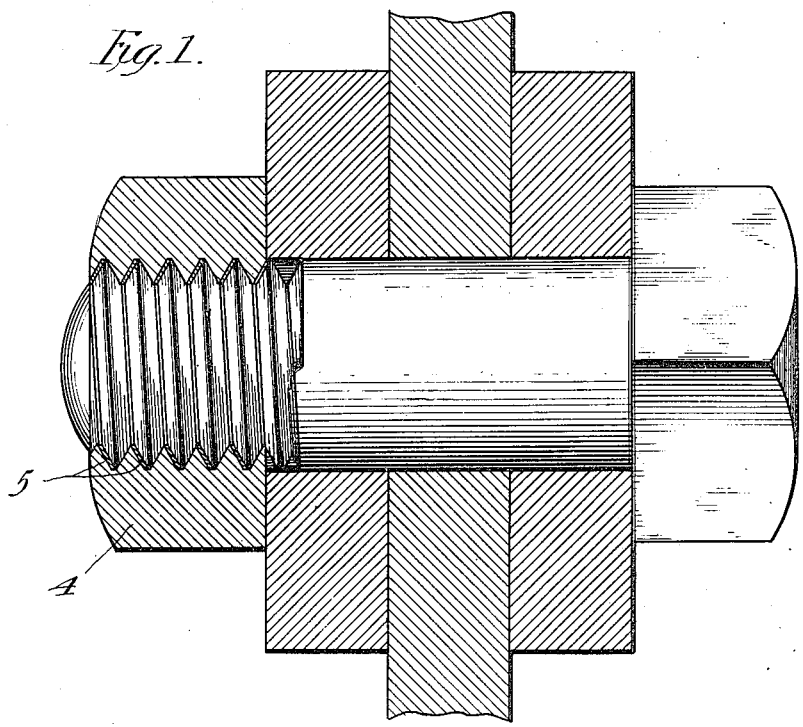
Figure 2:
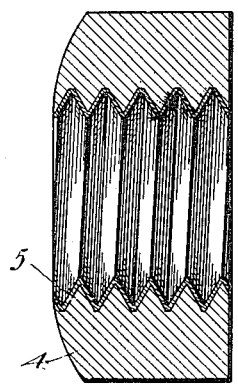
Figure 3:
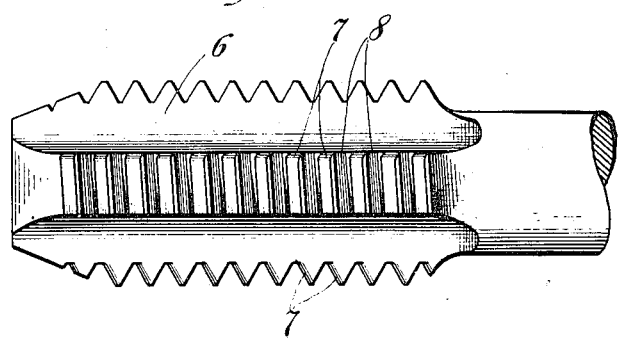

Figure 1 is a sectional view of the improved nut in position on a bolt. Fig. 2 is a longitudinal section of the lock nut in a partly completed state. Fig. 3 is a fragmentary side elevation of a special tap by means of which the final step in the formation of the lock nut is accomplished.

The nut 4 may be of any usual design and may conform exactly with accepted standards both as to thread shape and as to dimensions. After the nut has been tapped by the usual standard tap its threads are coated with suitable material so as to make the nut grip the threads of the bolt upon which it is screwed. For example, a standard nut 4 may be dipped into a molten soft metal such as a composition of tin and lead to form a coating 5 (Fig. 2) on its threads, which coating will adhere to the threads to a more or less uniform thickness. A rethreading tap 6 is then passed through the nut to remove the surplus of the coating material.

In order that the threads of the nut may engage those of the bolt directly on one side, namely, the side which is to be subjected to strain when in service, a retapping tool of special construction is used. In the form shown in Fig. 3 this tool differs from the ordinary standard tap merely in having but one cutting edge on each tooth thereof, and having the teeth slightly smaller than those of the standard tap. Thus, in the form shown the front part 7 of the advancing end of each tooth is slightly rounded to prevent it from cutting, whereas the rear part 8 is as usual a cutting edge. By reason of this construction when the retapping tool is passed through the nut, the rounded edges 7 cause the teeth of the tap to ride over the soft metal coating on the threads of the nut without cutting, while the rearward edges 8 remove the soft metal from the opposite or load-bearing surfaces of the threads of the nut. The finished product is then in the form of the nut shown in Fig. 1, where the soft metal coating is confined mainly to those faces of the threads which are normally not under strain, the bearing faces being substantially devoid of the coating except where the same fills irregularities in the surface. The retapping tool is so designed that in the finished lock nut the thread grooves will be smaller than the corresponding bolts of the nut so that when the bolt is screwed into the nut it will cut into or compress the soft metal, and be held by the latter in extremely firm frictional contact with the threads of the nut.

I claim:—

1. As an article of manufacture, a nut threaded to fit its bolt and having its threads coated mainly on one side thereof with material adapted to frictionally grip the bolt and secure the nut thereon.

2. As an article of manufacture, a standard nut threaded to fit a standard bolt and having its threads coated mainly on one side with a layer of softer metal and having the other side of the thread substantially free from such softer metal, whereby the threads of the bolt and nut will be in direct contact on one side, and will be held in frictional engagement with each other by said layer of softer material.

Signed at Chicago this 6th day of July, 1915.

IRVING C. WOODWARD.